United States Patent
Sawachi

(10) Patent No.: US 7,936,384 B2
(45) Date of Patent: May 3, 2011

(54) IMAGE TAKING SYSTEM

(75) Inventor: Youichi Sawachi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 718 days.

(21) Appl. No.: 11/865,101

(22) Filed: Oct. 1, 2007

(65) Prior Publication Data

US 2008/0079824 A1    Apr. 3, 2008

(30) Foreign Application Priority Data

Sep. 29, 2006  (JP) .................................. 2006-267433

(51) Int. Cl.
- H04N 5/262 (2006.01)
- H04N 5/222 (2006.01)
- H04N 5/225 (2006.01)
- H04N 5/232 (2006.01)
- G03B 13/00 (2006.01)

(52) U.S. Cl. ................ 348/240.1; 348/333.03; 348/335; 348/347

(58) Field of Classification Search .................... None
See application file for complete search history.

(56) References Cited

U.S. PATENT DOCUMENTS

| | | | | |
|---|---|---|---|---|
| 4,159,170 A | * | 6/1979 | Kuramoto et al. | 396/544 |
| 5,266,985 A | * | 11/1993 | Takagi | 396/147 |
| 5,430,473 A | * | 7/1995 | Beecher et al. | 348/14.05 |
| 5,565,947 A | | 10/1996 | Chamberlain, IV | |
| 5,926,218 A | * | 7/1999 | Smith | 348/207.99 |
| 6,111,604 A | * | 8/2000 | Hashimoto et al. | 348/220.1 |
| 6,246,837 B1 | * | 6/2001 | Kageyama et al. | 396/287 |
| 6,606,117 B1 | * | 8/2003 | Windle | 348/239 |
| 6,700,619 B1 | * | 3/2004 | Hamamura | 348/370 |
| 7,092,015 B1 | * | 8/2006 | Sogawa | 348/222.1 |
| 2005/0122401 A1 | | 6/2005 | Horie | |
| 2007/0035628 A1 | * | 2/2007 | Kanai | 348/159 |
| 2007/0115363 A1 | * | 5/2007 | Nakamura | 348/208.14 |

FOREIGN PATENT DOCUMENTS

| | | |
|---|---|---|
| JP | 5-53186 A | 3/1993 |
| JP | 2001-249265 A | 9/2001 |
| JP | 2002-328408 A | 11/2002 |
| JP | 2003-131120 A | 5/2003 |
| JP | 2004-029807 A | 1/2004 |
| JP | 2005-020205 A | 1/2005 |
| JP | 2005-121838 A | 5/2005 |
| JP | 2006-074368 A | 3/2006 |

* cited by examiner

*Primary Examiner* — Sinh Tran
*Assistant Examiner* — Jason A Flohre
(74) *Attorney, Agent, or Firm* — Sughrue Mion, PLLC

(57) ABSTRACT

In the image taking method where images of an object are taken by a running image taking portion provided with a zoom lens, and at least one image taking portion for measuring a distance provided with a fixed focus lens equal to the wide-angle-side end of the zoom lens to generate image data, an image taking method includes the steps of simultaneously taking an image by each image taking system and detecting and storing a zoom position at an arbitrary angle of view of the zoom lens. A search space in a photographing field in the stored zoom position is set. When it is determined that no corresponding point is on one of the end faces of the set space, a running image is taken after the zoom lens is moved to the stored zoom position by the zoom lens drive means.

9 Claims, 9 Drawing Sheets

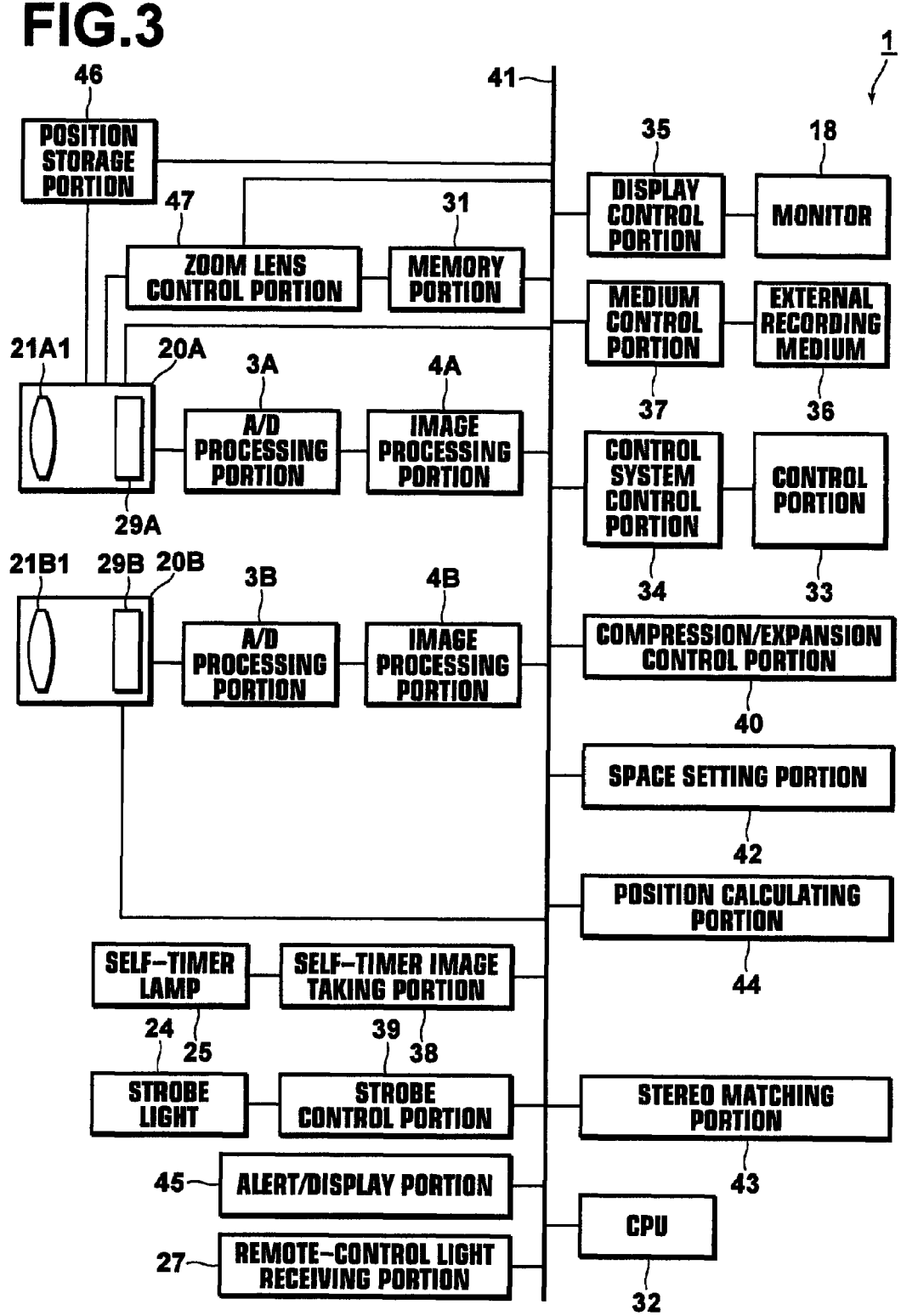

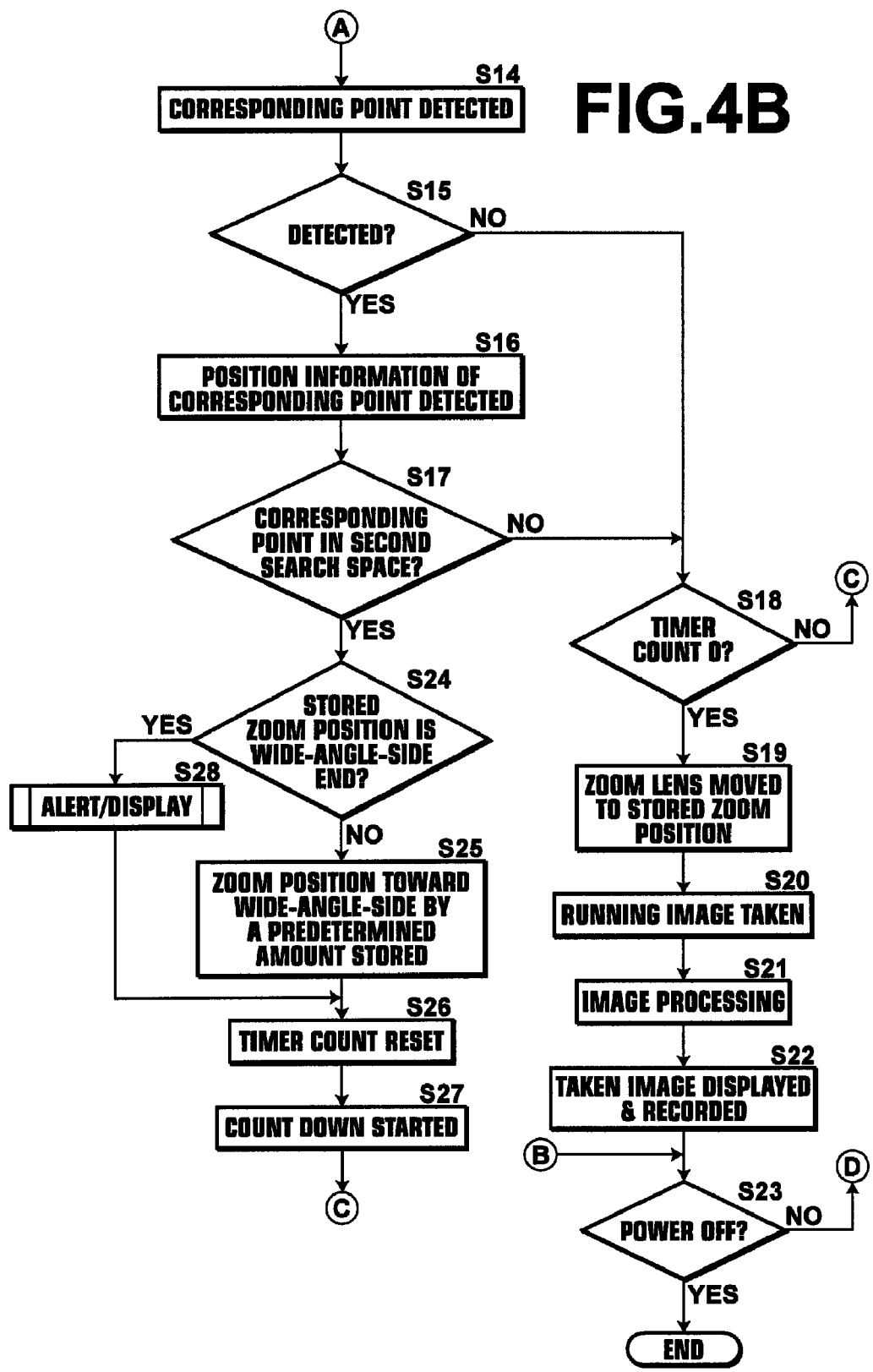

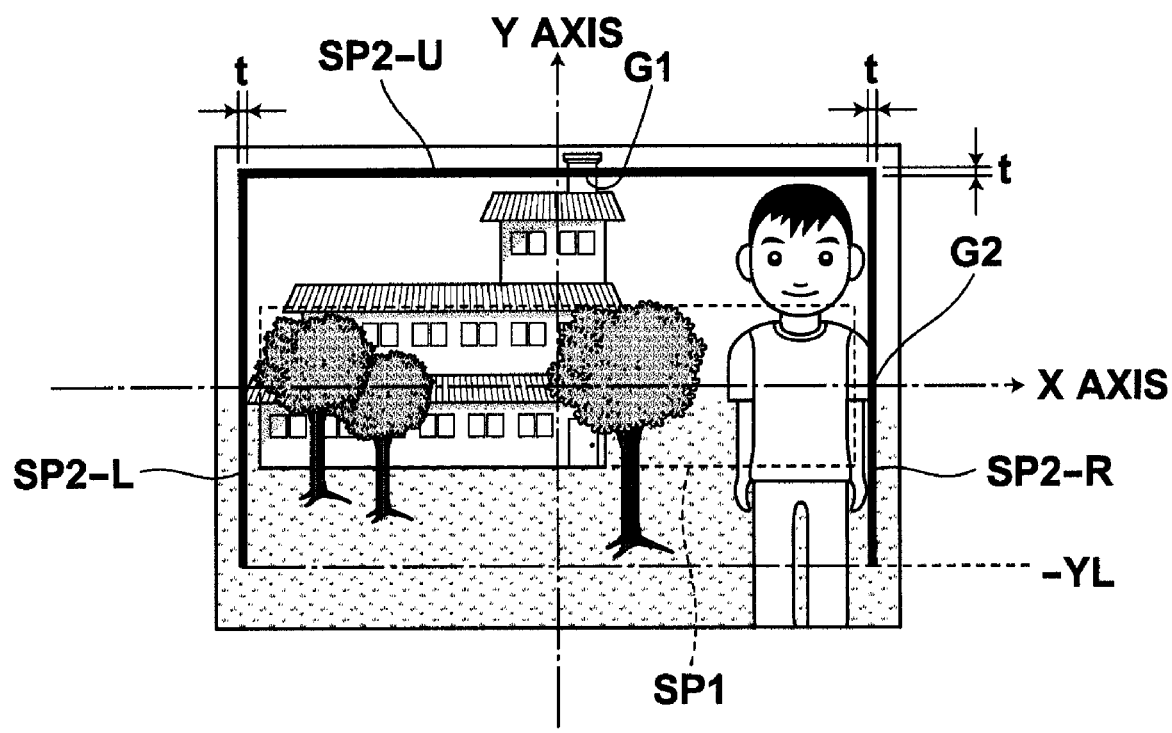

IMAGE TAKING SYSTEM

BACKGROUND OF THE INVENTION

1. Field of the Invention

This invention relates to an image taking system such as a digital still camera, and more particularly to an image taking system where an angle of view is automatically adjusted.

2. Description of the Related Art

There have been put into practice an image taking system such as a digital camera and a digital video camera having a self-timer function which actually takes an image of an object predetermined times after depression of a shutter release button or a remote control photographing function which takes an image of an object under remote control. In taking an image with such an image taking system, for instance, when the photographer himself or herself makes an object to be taken, the photographer himself or herself goes into the photographic field of the image taking system after setting the photographic field with a liquid crystal monitor or a finder, and accordingly, the photographer himself or herself cannot know whether he or she is in the angle of coverage upon taking the image, whereby the photographer himself or herself sometimes is not in the image. This is apt to take place especially when a gathering picture is to be taken and the photographer himself or herself should be in an end of the taken image.

Thus, there has been proposed to determine whether the object person is in the angle of coverage upon taking the image, by the use of a camera which projects light onto the range corresponding to the angle of coverage (Japanese Unexamined Patent Publication No. 5 (1993)-053186, a camera provided on the front face thereof with a member which opens by an angle corresponding to the angle of coverage (U.S. Pat. No. 5,565,947) so that the member can be viewed from the object, a camera which is provided with a multi-point distance measuring function and displays the result of distance measurement on a plurality of distance measuring points (Japanese Unexamined Patent Publication No. 2003-131120), and the like.

However, in the cameras disclosed in Japanese Unexamined Patent Publication No. 5(1993)-053186 and U.S. Pat. No. 5,565,947), it is difficult to determine whether the parts of the object person other than the eyes are in the photographic field since the object person visually checks the light projected or a member and since it is difficult for the object person to always arcuately visually check them due to fluctuation by the affect of the external light or the individual difference, there is a fear that it is slightly difficult to surely take the object person in the photographic field.

Further, in the camera disclosed in Japanese Unexamined Patent Publication No. 2003-131120, though it can be confirmed that some matters go into the distance measuring points, it is difficult to determine whether the object person is in the photographic field, further when there are a plurality of object persons as in a gathering picture, it is difficult to determine whether all the object persons are in the photographic field, and accordingly there is a fear that it is slightly difficult to surely take the object persons in the photographic field as in the cameras described above.

SUMMARY OF THE INVENTION

In view of the foregoing observations and description, the primary object of the present invention is to provide an image taking system which when an object person is not in the photographing field, automatically adjusts the angle of coverage so that the object person is in the photographing field.

An image taking system of the present invention comprises two or more image taking portions each of which takes an image of an object to generate image data on the image, wherein one of the image taking portions is a running image taking portion provided with a zoom lens and a zoom lens drive means which drives the zoom lens, and at least one of the other image taking portions are image taking portions for measuring a distance provided with a fixed focus lens equal to the wide-angle-side end of the zoom lens in the angle of coverage, and is characterized by a zoom position storage means which detects and stores the zoom position of the zoom lens, a space setting means which sets a search space in a photographing field in zoom position stored in the zoom position storage means, an objective body detecting means which detects a predetermined objective body in the search space set by the space setting means, a position calculating means, which when the predetermined objective body is detected, calculates the position information of the detected objective body, a determining means which determines on the basis of the position information of the detected objective body calculated by the position calculating means whether at least a part of the objective body overlaps a left, right, upper or lower end face of the search space set by the space setting means, and a zoom lens control means which when the determining means determines that at least a part of the objective body overlaps an end face of the search space, shifts the zoom position stored by the zoom position storage means by a predetermined amount toward the wide-angle-side and stores the same.

In this invention, "a running image taking" means "an image taking" carried out on the basis of the data output by the AE processing and the AF processing in order to obtain image data to be recorded in the image taking system as a photographed image.

In the image taking system of the present invention, the objective body detecting means carries out a stereomatching processing on the pair of pieces of image data generated by the running image taking portion and the image taking portions for measuring a distance and detects one or more corresponding points which correspond to each other in each image data.

It is preferred that the image taking portions but at least the running image taking portion be provided with an image pick-up element less than the running image taking portion in number of pixels and/or having a sensitivity only to the brightness or a monochromatic light.

The image taking system of the present invention may further comprises an alert display means which displays when the determining means determines at least a part of the objective body overlaps one of the end faces, the end face on which the objective body overlaps, and the alert display means may carry out the display when the zoom lens control means shifts the zoom position stored by the zoom position storage means to the wide-angle-side end and stores the same.

In the image taking system of the present invention, the alert display means may be provided on the back surface of the system.

In the image taking system of the present invention, the alert display means may be provided on the front surface of the system.

In the image taking system of the present invention, it is preferred that the alert display means displays the direction in which the objective body is to be moved in order to be in the search space.

The image taking system of the present invention may further comprises a self-timer means which has a self-timer lamp in which the alert display means may be used in common with the self-timer lamp.

An image taking method of the present invention comprises the steps of, in the image taking method where images of an object are taken by a running image taking portion provided with a zoom lens and a zoom lens drive means which drives the zoom lens, and at least one image taking portion for measuring a distance provided with a fixed focus lens equal to the wide-angle-side end of the zoom lens to generate image data, detecting and storing a zoom position at an arbitrary angle of view of the zoom lens, setting a search space in a photographing field in the stored zoom position, taking the images by the running image taking portion and said at least one image taking portion for measuring a distance after moving the zoom lens to the wide-angle-side end of the zoom lens, detecting a predetermined objective body in the search space in the image data obtained by the image taking, calculating, when the predetermined objective body is detected, the position information of the detected objective body, determining on the basis of the position information of the detected objective body whether at least a part of the objective body overlaps a left, right, upper or lower end face of the search space set by the space setting means, shifting, when it is determined that at least a part of the objective body overlaps one of the end faces of the search space, the zoom position stored by the zoom position storage means by a predetermined amount toward the wide-angle-side and storing the same.

In accordance with the present invention, there is provided a second image taking method comprising the steps of, in the image taking method where images of an object are taken by a running image taking portion provided with a zoom lens, and a zoom lens drive means which drives the zoom lens, and at least one image taking portions for measuring a distance provided with a fixed focus lens equal to the wide-angle-side end of the zoom lens to generate image data, detecting and storing a zoom position at an arbitrary angle of view of the zoom lens, setting a first search space in a photographing field in the stored zoom position, taking the images by the running image taking portion and said at least one image taking portion for measuring a distance after moving the zoom lens to the wide-angle-side end of the zoom lens, carrying out stereomatching processing on the first search space in the image data obtained by the image taking to detect one or more corresponding points which correspond to each other in each image data, detecting the frontmost point nearest to the image taking portion in the detected corresponding points, setting a second search space in a predetermined range including the detected frontmost point before and after the detected frontmost point, carrying out stereomatching processing on the set second search space to detect one or more corresponding points, determining, when a corresponding point is detected, whether it is on one of the left, right and the upper end faces of the second search space, shifting the zoom position stored by the zoom position storage means by a predetermined amount toward the wide-angle-side when it is determined that the corresponding point is on one of the end faces, storing the same, and a running image is taken after the zoom lens is moved to the stored zoom position by the zoom lens drive means when it is determined that no corresponding point is on one of the end faces.

In accordance with the present invention, the zoom position stored by the zoom position storage means is moved and stored toward the wide-angle-side by a predetermined amount until no parts of objective body such as the object person is found in the search space, that is, until the object person is certainly settled in the photographing field whereby a zoom position where the object person is certainly settled in the photographing field is determined. With this arrangement, even if the photographer depresses the shutter release button without his or her sufficient confirmation of the photographing field, the object person can be automatically in the photographing field.

BRIEF DESCRIPTION OF THE DRAWINGS

FIG. 3 is a block diagram showing structure of the digital camera,

FIG. 4B is a view showing the other part of the flowchart for illustrating processing of the digital camera, FIG. 5 is a view showing an example of the image taken at the wide-angle-side end of the digital camera.

DESCRIPTION OF THE PREFERRED EMBODIMENT

Embodiments of the present invention will be described with reference to the drawings, hereinbelow. Though, digital cameras will be described in the following embodiments, application of the present invention need not be limited to the digital cameras but may be, other electronic instruments provided with an electronic imaging function such as a digital video camera, a mobile phone with a camera or a PDA with a camera.

Figure 1:
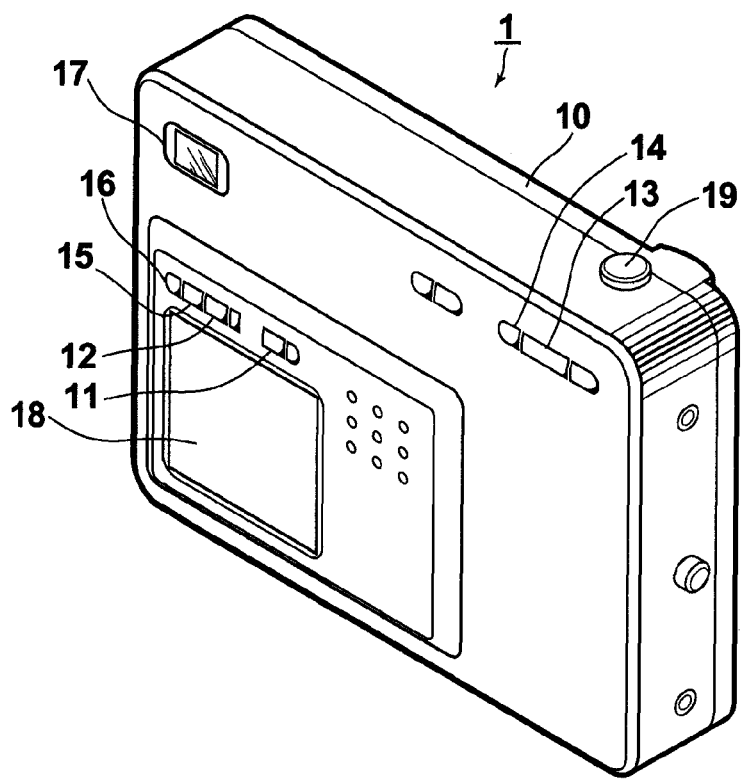
FIG. 1 is a perspective view showing a digital camera as viewed from rear.
Figure 2:
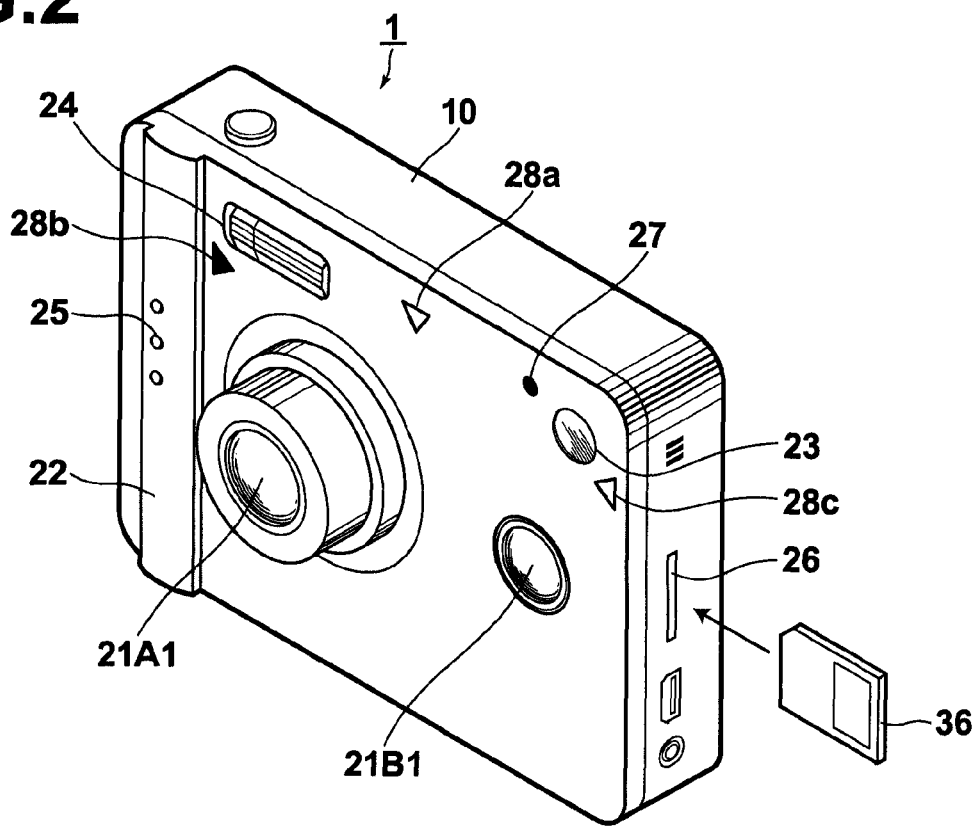
FIG. 2 is a perspective view showing the digital camera as viewed from front.

FIGS. 1 and 2 show an example of the digital camera as viewed from rear and the front. The digital camera 1 of this embodiment will be described with the side on which the shutter release button 19 is positioned taken as the upper side for the purpose of simplicity.

As shown in FIG. 1, as an interface for control by the photographer, an action mode switch 11, a menu/OK button 12, an up and down lever 13, a right and left button 14, a back (return) button 15 and a display switching button 16 are provided on the rear surface of the body of the digital camera 1. The digital camera 1 is further provided with a finder 17 for image taking and a liquid crystal monitor 18 and a shutter release button 19 for image taking and for reproduction.

The action mode switch 11 is a slide switch for switching the action modes between a still image taking mode, an animation taking mode and a reproduction mode. The menu/OK button 12 is a button for displaying on the monitor 18 various menus for setting the image taking mode, a strobe lighting mode, ON and OFF of the self-timer, recording pixel number or sensitivities each time it is depressed, and for selection/setting on the basis of the menu displayed on the monitor 18.

When the up and down lever 13 is inclined up and down, the cursor displayed in the menu screen displayed on the monitor 18 is moved up and down when various values are set. The right and left button 14 is a button for moving right and left the cursor in the menu screen displayed on the monitor 18 when various values are set.

When the back (return) button 15 is depressed, setting of the various values is interrupted, and the preceding screen is displayed on the monitor 18. The display switching button 16 is a button for switching ON and OFF of the display on the monitor 18, various guidance messages, ON and OFF of the character display when depressed. The finder 17 is viewed by the user when taking an image to obtain a desired composition of a picture and to bring the object into focus. The image of the object viewed through the finder 17 is displayed on the finder window 23 provided in the front face of the camera body 10.

The contents set by the control of the button or the lever can be recognized through, for instance, the display on the monitor 18, the lamp in the finder 17, or the position of the slide lever. Further, the monitor 18 displays a through image for confirming the object when taking an image. With this arrangement, the monitor 18 displays a still image and an animation after photographing and various menus as well as functions as an electronic view finder. When the shutter release button 19 is semi-depressed, an AE processing and an AF processing to be described later are carried out and when the shutter release button 19 is full-depressed, an image is taken on the basis of data output through the AE processing and the AF processing, and the image displayed by the monitor 18 is recorded as the taken image.

As shown in FIG. 2, a taking lenses 21A1 and 21B1, a power switch 22, the finder window 23, a strobe light 24, a self-timer lamp 25, and a remote control light receiving portion 27, are provided on the front surface of the camera body 10. A medium slot 26 is provided on the side surface of the camera body 10.

The taking lenses 21A1 and 21B1 are for imaging an image of the object on a predetermined imaging surface (e.g., a CCD inside the camera body 10) and comprises a focusing lens, a zoom lens and the like. The taking lenses 21A1 and 21B1 are disposed vertically in the same position and horizontally spaced from each other by a predetermined distance so that the optical axes are in parallel to each other and simultaneously take images of the same object. The taking lenses 21A1 and 21B1 are covered with a lens cover covering the surface of the taking lenses 21A1 and 21B1, for instance, when the power source of the digital camera 1 is off or when the digital camera 1 is in the reproduction mode, to protect the taking lenses 21A1 and 21B1 from stain, dirt and the like.

The power switch 22 turns on and off the power source of the digital camera 1. The strobe light 24 momentarily irradiates the object with a necessary amount of light while the shutter release button 19 is depressed and the shutter in the camera body 10 is opened. The self-timer lamp 25 is for informing the object of the shutter open/close timing, i.e., the start and the end of the exposure, when an image is taken with the self-timer. The medium slot 26 is a port in which an external recording medium 70 such as a memory card is loaded, and when the external recording medium 70 is loaded therein, read-out or write-in of data is carried out.

The remote control light receiving portion 27 is for receiving, e.g. infrared rays from a remote control unit (not shown) for controlling the shutter of the digital camera 1 to take an image by remote control.

The upper alarm lamp 28a, right alarm lamp 28b and the left alarm lamp 28c forming the alarm lamp 28 are formed, for instance, by LED and are substantially triangular. The triangles respectively formed by the upper alarm lamp 28a, right alarm lamp 28b and the left alarm lamp 28c are disposed so that the apexes of the triangles are positioned inward of the front of the camera body 10 of the digital camera 1. The alarm lamp 28 will be described in detail later.

FIG. 3 is a block diagram showing functions of the digital camera 1. As shown in FIG. 3, the digital camera 1 is provided with a pair of image taking portions 20A and 20B which take images of an object in the same position to image images of the object on a light receiving face and to photoelectrically convert the same and respectively output the same as a pair of pieces of image data. The image taking portions 20A and 20B comprise optical systems 21A and 21B having the taking lenses 21A1 and 21B1 and CCDs 29A and 29B as image pick-up elements.

The image taking portion 20A is a first image taking portion provided with a zoom lens as the taking lens 21A1. The zoom lens is driven by a driver (not shown) comprising an electric motor and a motor driver to be moved on the basis of driving amount data output from a CPU to be described later in the direction of the optical axis. Behind the taking lens 21A1, a diaphragm and/or a mechanical shutter driven by an electric motor and a motor driver (not shown) are provided and these elements form the optical system 21A. The diaphragm is adjusted with the diameter of opening of the diaphragm on the basis of diaphragm data output from an image processing portion 4A and the mechanical shutter is opened and closed on the basis of a signal generated in response to depression of the shutter release button 19 and shutter speed data output from the CPU.

Behind the optical system 21A described above, a CCD 29A is provided. The CCD 29A has a photoelectric surface comprising a lot of light receiving elements arranged in matrix, and an image of the object passing through the optical system is imaged on the photoelectric surface to be photoelectrically converted to a charge signal of the amount according to the amount of light entering each sensor on the CCD 29A. The CCD 29A exhibits a function of a so-called electronic shutter, where electric charge accumulating time (shutter speed) of each of the sensors is controlled by the timing of shutter gate pulses.

The charge signals collected in each sensor are read out from the CCD 29A in sequence as a voltage signal (analog image signal) according to charge signals on the basis of the pulses applied from the CCD driver portion. The analog image signals output from the CCD 29A are input into an A/D processing portion 3A.

The A/D processing portion 3A comprises a signal processing circuit such as a sampling hold circuit, a color separation circuit, and a gain controller and an A/D converter. The analog image signals undergo a correlation double sampling (CDS) and are separated by color into R, G, B signals in the analog processing portion 23. The analog image signals further undergo a pre-white balance processing, where the signal level of each color is adjusted, and are converted to digital signals. Then the analog image signals are transmitted to the image processing portion 4A after converted to digital signals. The CCD driver and the A/D processing portion 3A are driven in synchronization with timing signals applied from a timing generator under the instruction of the CPU.

An image processing portion 64 comprises a digital signal processor (DSP) including an image quality adjusting circuit such as those for a γ correction, a sharpness correction, a contrast correction and a white balance correction, and processes the image signals to improve the image quality.

The image taking portion 20B is an image taking portion which is mainly used in measuring a distance, and is provided with a fixed focus lens equal to the wide-angle-side end of the zoom lens of the taking lens 21A1 in the angle of coverage. Though the taking lens 21B1 may be provided with a zoom lens equivalent to the zoom lens of the taking lens 21A1, this approach is disadvantageous in that it requires a driver which drives the zoom lenses of the image taking portions 20A and 20B interlocked with each other, which adds to the cost. By arranging as described above, the cost can be reduced. Behind the taking lens 21B1, a diaphragm and/or a mechanical shutter driven by an electric motor and a motor driver (not shown) are provided and these elements form the optical system 21B (not shown).

Behind the optical system 21B described above, a CCD 29B is provided. The CCD 29B maybe less than the CCD 29A of the first image taking portion 20A in number of the pixels and may have a sensitivity only to a brightness or a monochrome so long as accuracy in measuring a distance can be ensured. With this arrangement, the cost can be reduced. Though may be substantially the same as the A/D processing portion 3A and the image processing portion 4A described above, the A/D processing portion 3B and the image processing portion 4B are provided with a throughput capacity according to the CCD 29B. The image taking portions 20A and 20B thus arranged take images of an object at the same timing at the same angle of coverage.

A memory portion 31 is for storing, for instance, various constants set in digital camera 1, and programs executed by CPU 32 and may comprise, for instance, an SDRAM (synchronous dynamic random access memory) which transfers data in synchronization with bus clock signals of a constant period. The memory portion 31 further comprises a working memory and the like used when the image processing portion 4A or 4B carries out digital image signal processing (signal processing) on the image data. The pair of pieces of image data A and B image-processed by the image processing portion 4A or 4B are stored in the memory portion 31 at the same timing.

The control portion 33 comprises the action mode switch 11, the menu/OK button 12, the up and down lever 13, the right and left button 14, the back (return) button 15, the display switching button 16, the shutter release button 19 and the power switch 22, and the control system control portion 34 is an interface for transmitting contents of the control of the control portion 33 to the CPU 32.

A display control portion 35 is for displaying as a through image, on the monitor 18, image data A stored in the memory portion 31 and integrates a brightness (Y) signal and a color (C) signal into a composite signal to output the composite signal to the monitor 18. The through image is taken at predetermined time intervals while the image taking mode is selected and is displayed on the monitor 18. Further, the display control portion 35 permits to display an image, on the monitor 18, based on image data A stored in the external recording medium 36 and included in an image file read out by a medium control portion 37.

The self-timer image-taking portion (self-timer photographing means) 38 is provided with a timer system (not shown) which measures lapse of a predetermined waiting time (e.g., 5 seconds from full-depression of the shutter release button 19) from full-depression of the shutter release button 19 to the time that a running image is actually taken, and controls the system so that a depression signal of the shutter release button 19 is output to the image taking portion 30A by way of the CPU 32 when the timer system measures 0. The self-timer lamp 25 is blinked during the waiting time for informing the photographer or the like of the start of the exposure. The ON/OFF of the self-timer by the self-timer image-taking portion 38 may be selected on the selection screen on the monitor 18 or may be set by providing a self-timer timer button (not shown) on the rear surface of the camera body 10. A strobe control portion 39 controls emission of the strobe lamp 24.

A compression/expansion processing portion 40 compresses, for instance, in JPEG format, the image data A which has been processed with, for instance, the image correction by the image processing portion 4A and generates an image file. To this image file, information is attached on the basis of the data format. This compression/expansion processing portion 40, in a reproduction mode, reads out the compressed image file from the external recording medium 36 and expands it. Expanded image data is output to the display control portion 35 and the display control portion 35 displays an image on the basis of the image data on the monitor 18.

The medium control portion 37 corresponds to a medium slot 26 in FIG. 2 and reads out the image file and the like stored in the external recording medium 36 and writes image files.

A space setting portion 42 sets a search space to be described later in each of the photographing fields of the image taking portions 20A and 20B. Setting of the space will be described in detail later.

A stereomatching processing portion (objective body detecting means) 43 detects at least one corresponding points (objective body) corresponding to each other in the search spaces set by the space setting portion 42 in the pair of pieces of image data A and B which have been respectively image-processed by the image processing portions 4A and 4B and stored in the memory portion 31. The method of processing in the stereomatching processing portion 43 can use a known technic such as those using a domain base method, a segment base method or an equibrightness line method.

A position calculating portion 44 calculates three-dimensional coordinates (position information) of the corresponding points detected by the stereomatching processing portion 43. The method of calculation in the position calculating portion 44 can use a known method, where the three-dimensional coordinates are calculated on the basis of the principle of trignometry. The space setting portion 42, stereomatching processing portion 43 and the position calculating portion 44 may be arranged either by programs or by IC or LSI or the like.

The CPU 32 totally controls the digital camera 1 on the basis of the inputs from the control portion 33 and also functions to control the zooming action of the focusing lens driver, focusing (AF) action, the automatic exposure control (AE) action, and the like. Further, the CPU also functions (as a determining means) to determine whether the corresponding point is in the search space set by the space setting portion 42 on the basis of the three-dimensional coordinates calculated by the position calculating portion 44.

An alert display portion 45 includes the alarm lamp 28, and is provided with a control portion (not shown) which when the CPU 32 determines that the corresponding point is on one of the end faces of the search space, lights the alarm lamp 28. Lighting the alarm lamp 28 will be described in detail later.

A position storage portion (zoom position storage means) 46 detects a zoom position at an arbitrary angle of view of the zoom lens of the image taking portion 20A and stores the same.

A zoom lens control portion 47 shifts the zoom position stored by the zoom position storage portion 46 by a predetermined amount toward the wide-angle-side and stores the same in the zoom position storage portion 46. The various signals and data described above are transmitted and received by way of the data bus 41.

Figure 4A:
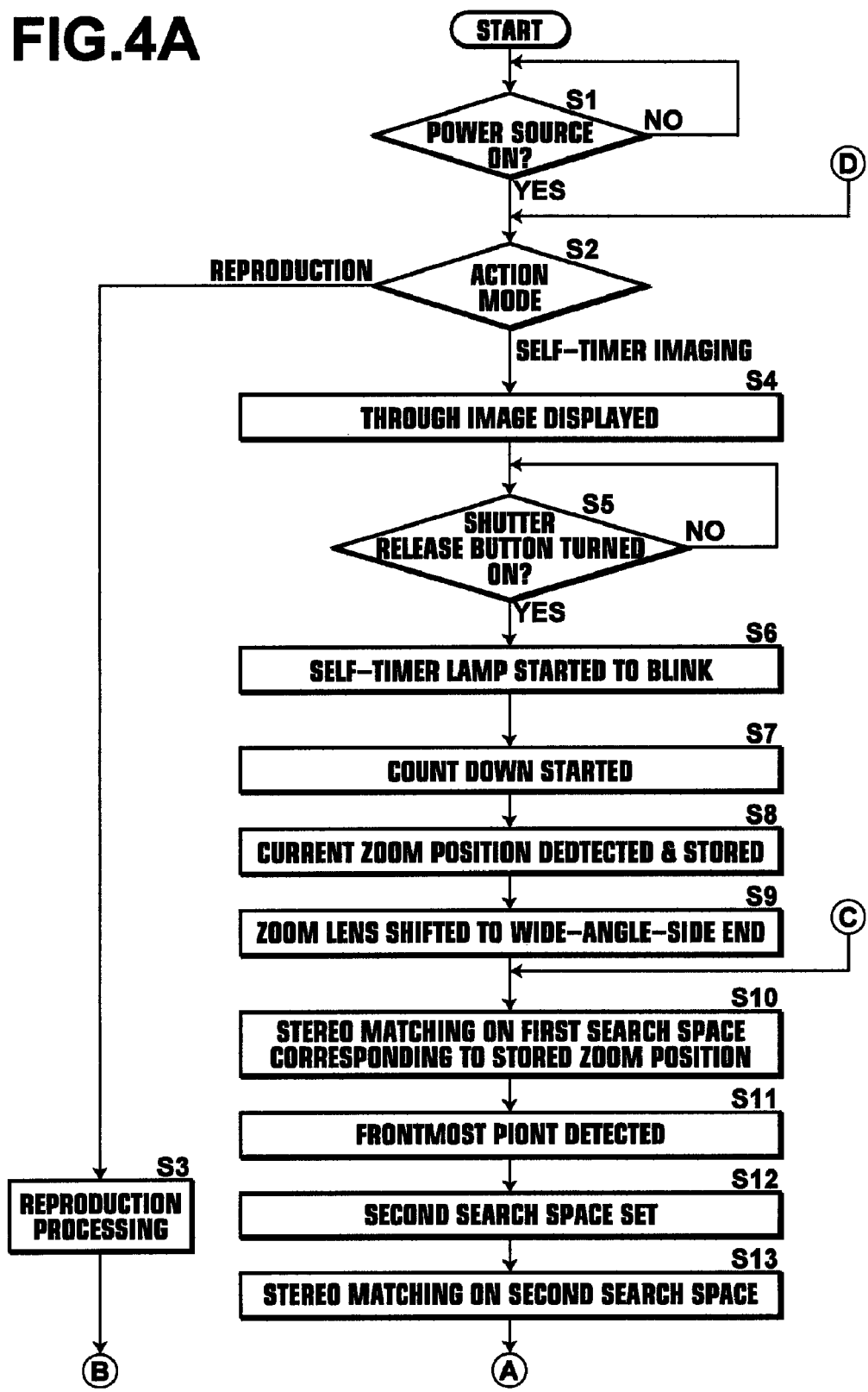
FIG. 4A is a view showing a part of a flowchart for illustrating processing of the digital camera.

An operation of the digital camera 1 when taking an image will be described, hereinbelow. The method of taking an image of this example is useful when an image is taken without the photographers viewing the monitor 18 or the finder 17 such as the self-timer photographing or the remote control photographing, and is especially useful when the photographer himself or herself is the object, for instance, when a gathering picture is taken. The method of taking an image when the self-timer photographing is to be carried out will be described, hereinbelow. FIGS. 4A and 4B show a flowchart of a series of processing in the digital camera 1.

As shown in FIG. 4A, the CPU 32 first determines whether the power switch 22 of the digital camera 1 is ON (step S1). When the power switch 22 of the digital camera 1 is not ON (step S1:NO), the CPU 32 repeats the processing of step S1 until the power switch 22 of the digital camera 1 is ON. When the power switch 22 of the digital camera 1 is ON (step S1:YES), the CPU 32 determines the working mode of the digital camera 1 according to the setting of the action mode switch 11 (step S2). When it is determined that the working mode is the reproduction mode, the reproduction is carried out(step S3), where the medium control portion 37 reads out the image file stored in the external recording medium 36 and displays on the monitor 18 an image on the basis of the image data in the data file. After the reproduction is ended, as shown in FIG. 4B, the CPU 32 determines whether the power source of the digital camera 1 is off (step S23) and when the power source of the digital camera 1 has been turned off (step S23: YES), the CPU 32 breaks the power source of the digital camera 1 and ends the processing. When the power source of the digital camera 1 has not been turned off (step S23:NO), the CPU 32 shifts its processing to step S2 as shown in FIG. 4A.

On the other hand, when it is determined in step S2 that the working mode is the self-timer image-taking mode, the CPU 32 displays a through image (step S4). Displaying a through image is a processing to display on the monitor 18 an image based on image data A stored in the memory portion 31 from the image processing portion 4A. Then when the AE processing, the AF processing, and the like are executed and the photographer determines the photographing field and the shutter release button 19 is depressed to input an instruction to take an image into the CPU 32 by way of the control system control portion 34, the CPU 32 determines whether the shutter release button 19 is ON (step S5).

When the shutter release button 19 is not ON (step S5:NO), the CPU 32 repeats the processing of step S5 until the shutter release button 19 is turned ON. When the shutter release button 19 is ON (step S5:YES), the self-timer photographing portion 38 is started to cause the self-timer lamp 25 to brink (step S6) and is started to count down (step S7). When the count down is started, the zoom position storage portion 46 detects and stores the current zoom position of the zoom lens of the image taking portion 20A (step S8). The photographer determines the photographing field, that is, the zoom position before step S5.

Then, the zoom lens of the image taking portion 20A is shifted to the wide-angle-side end of the zoom lens by the zoom lens driver (step S9). The stereomatching processing portion 43 carries out a stereomatching processing on a first search space SP1' corresponding to a zoom position stored in the zoom position storage portion 46 (step S10).

Figure 6A:
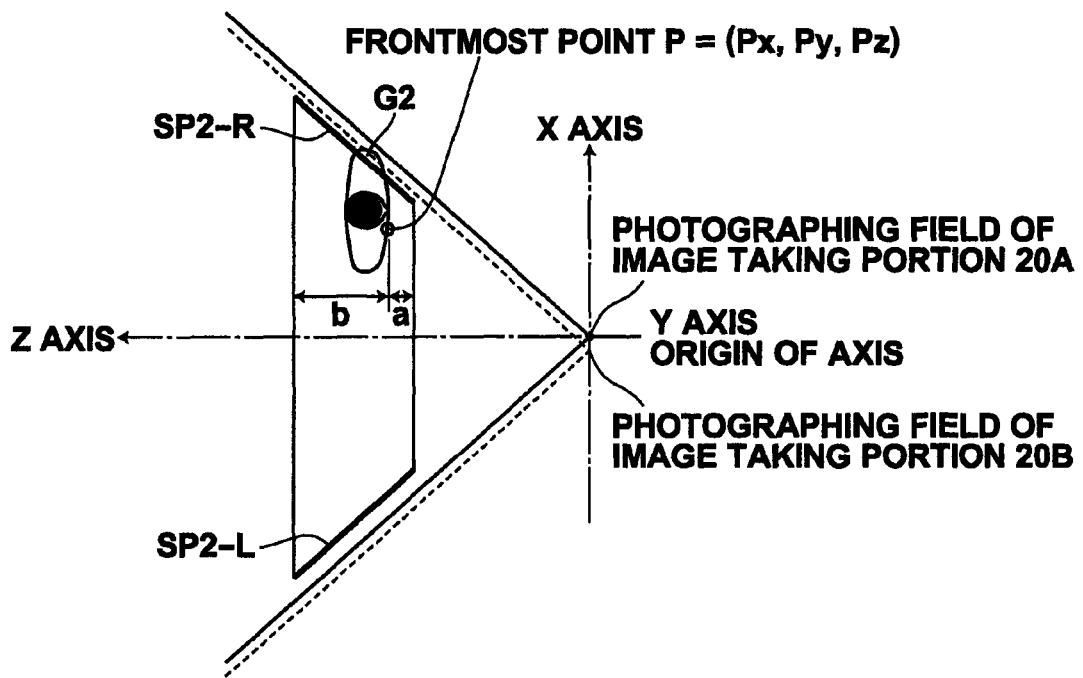
FIG. 6A is a plan view showing an example of a photographing field at the wide-angle-side end of the digital camera.
Figure 6B:
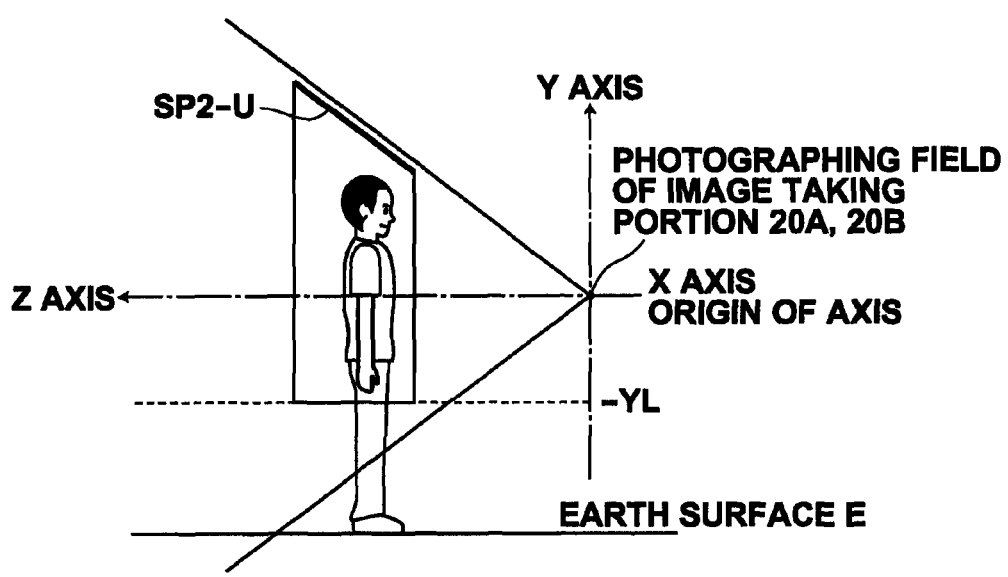
FIG. 6B is a side view showing the example of the photographing field at the wide-angle-side end of the digital camera.

A method of setting the first and second search spaces SP1 and SP2 of the image taking portions 20A and 20B in the wide-angle-side end will be described first. FIG. 5 is a view showing an example of the image taken by the image taking portion 20A or 20B at the wide-angle-side end of the zoom lens, FIG. 6A is a plan view showing a photographing field of the digital camera 1 when the zoom lens of the image taking portion 20A is at the wide-angle-side end, and FIG. 6B is a side view showing the photographing field of the digital camera 1 when the zoom lens of the image taking portion 20A is at the wide-angle-side end. In FIGS. 5, 6A and 6B, the left and right direction of the photographed image is taken as the X-axis, the up and down direction thereof is taken as the Y-axis, and the optical axis of the taking lens 21A1 of the first image taking portion 20A is taken as the Z-axis with the viewpoint of the first image taking portion 20A (the center of the taking lens 21A1) taken as the origin of the axes in the image data A of the first image taking portion 20A while with the viewpoint of the second image taking portion 20B (the center of the taking lens 21B1) taken as the origin of the axes in the image data B of the second image taking portion 20B.

The first search space SP1 is set in a range where the frequency the main object to be photographed is in the photographing fields of the image taking portions 20A and 20B is expected to be high and as shown by the dotted line in FIG. 5, the first search space SP1 is set in the direction of Y-axis in about ⅓ of the width of the taken image in the direction of Y-axis at a central portion having a center on the origin of the axes, while in the direction of X-axis, the first search space SP1 is set slightly inward of the outer frame of the photographed image or the photographing fields. At this time, in the direction of X-axis, the first search space SP1 is set inward of the second search space SP2 to be described later. Since the first search space SP1 set here is used as an area for carrying out a stereomatching processing as described above, the first search space SP1 is not set in the direction of Z-axis. Setting range of the first search space SP1 is arbitrarily changeable by the user of the digital camera 1, for instance, by controlling the control portion 33.

As shown in FIG. 5, the second search space SP2 is set, in the direction of X-axis, slightly inward of the photographing fields or the outer frame of the photographed image at the wide-angle-side end and in the upward direction of Y-axis, slightly inward of the outer frame of the photographed image or the photographing field at the wide-angle-side end as in the direction of X-axis. Further, in the downward direction of Y-axis, the second search space SP2 is set at a predetermined value-Ly (See FIG. 6B) not to detect, for instance, the surface of the earth. The "a predetermined value-Ly" and the ranges in the directions of X-axis and Y-axis are determined in advance in the digital camera 1 and are arbitrarily changeable by the user of the digital camera 1, for instance, by controlling the control portion 33.

Further, in the direction of Z-axis, the second search space SP2 is set at a predetermined range before and after the above mentioned frontmost point P(Px, Py, Pz) the frontmost point P inclusive. That is, as shown in FIG. 6A, in the direction of Z-axis, the second search space SP2 is set from a point apart from the Z-axis coordinate Pz of the frontmost point P(Px, Py, Pz) in the minus direction (the rearward direction:toward the image taking portions 20A and 20B) by a predetermined value a to a point apart from the Z-axis coordinate Pz of the frontmost point P(Px, Py, Pz) in the plus direction (the forward direction:away from the image taking portions 20A and 20B) by a predetermined value b. The predetermined values a and b are values set in advance taking into account the situation where a plurality of object persons (including the photographer himself or herself) to be taken overlap each other, for instance, when a gathering picture is to be taken, and are arbitrarily changeable by the user of the digital camera 1, for instance, by controlling the control portion 33.

Then, a left-end face SP2-L, a right-end face SP2-R and an upper-end face SP2-U each having a predetermined thickness t (FIGS. 5, 6A and 6B) are set on the left and right ends and an upper end of the range of the second search space SP2. The thickness t is set to be about 5% of the image area of the image data A and the image data B which have been stored in the memory portion 31. The thickness t is arbitrarily changeable by the user of the digital camera 1, for instance, by controlling the control portion 33. When the second search space SP2 is set in this manner, the stereomatching processing has to be carried out over a limited search range and requires a relatively short time.

Figure 7:
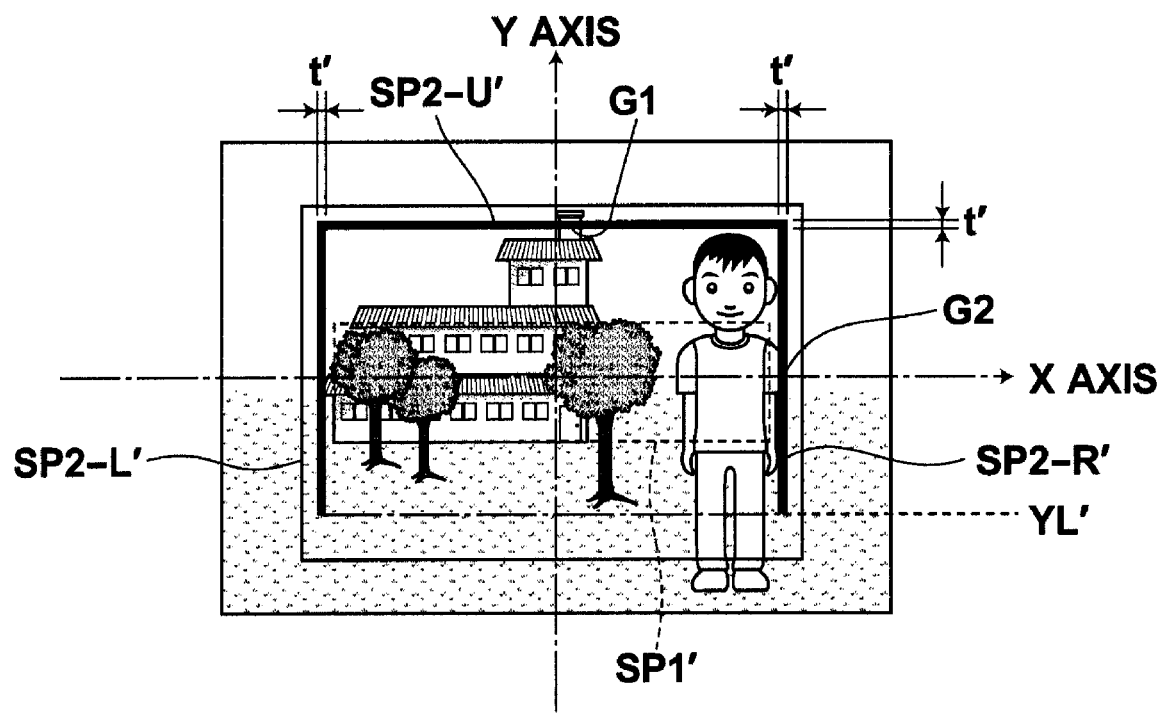
FIG. 7 is a view showing an example of the image taken in a stored zoom position of the digital camera.
Figure 8A:
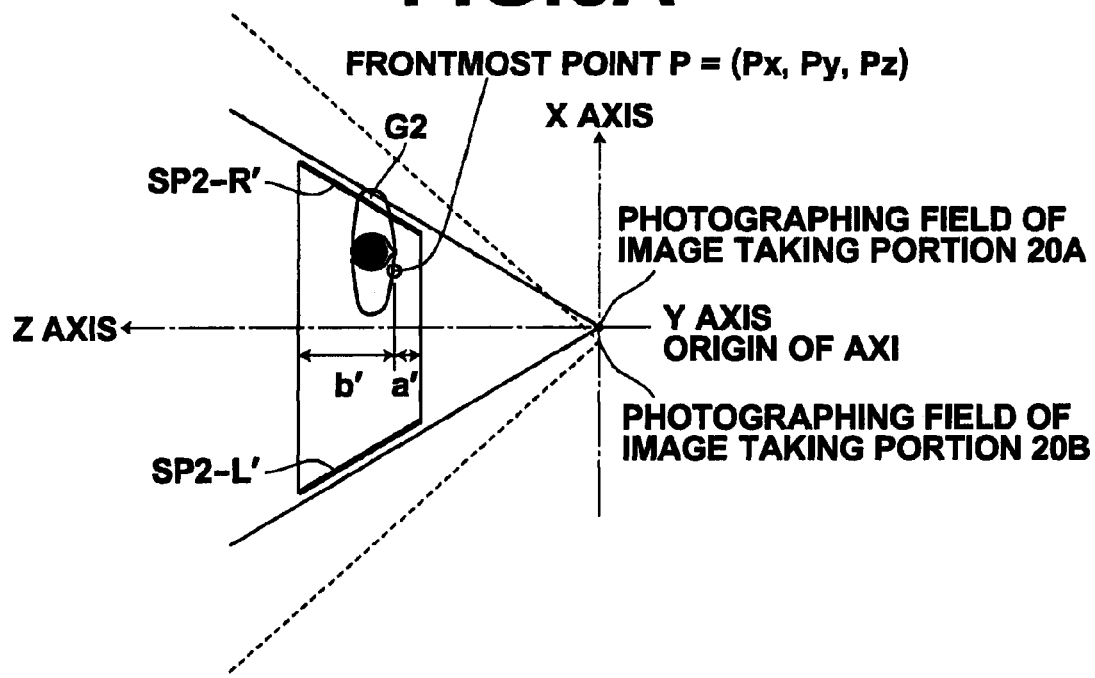
FIG. 8A is a plan view showing an example of a photographing field in a stored zoom position of the digital camera.
Figure 8B:
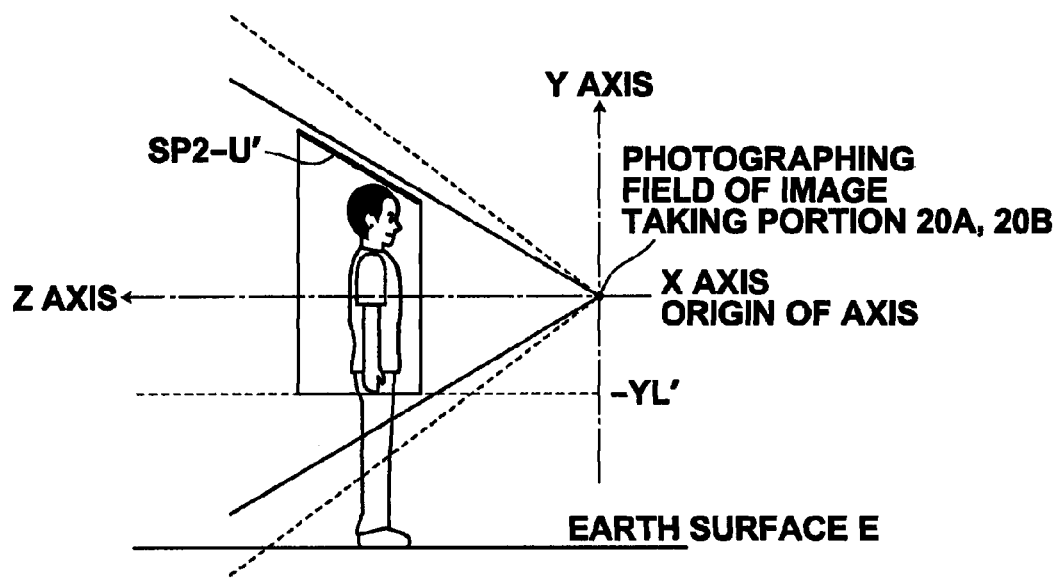
FIG. 8B is a side view showing the example of the photographing field in the stored zoom position of the digital camera.

A first search space SP1' corresponding to a zoom position stored by the zoom position storage portion 46 will be described next. FIG. 7 is a view showing an example of the image taken at the wide-angle-side end of the zoom lens, FIG. 8A is a plan view showing a photographing field of the digital camera 1, and FIG. 8B is a side view showing the photographing field of the digital camera 1. In FIGS. 7, 8A and 8B, the left and right direction of the photographed image is taken as the X-axis, the up and down direction thereof is taken as the Y-axis, and the optical axis of the taking lens 21A1 of the first image taking portion 20A is taken as the Z-axis with the viewpoint of the first image taking portion 20A (the center of the taking lens 21A1) taken as the origin of the axes in the image data A of the first image taking portion 20A while with the viewpoint of the second image taking portion 20B (the center of the taking lens 21B1) taken as the origin of the axes in the image data B of the second image taking portion 20B.

The first search space SP1' is set, in a zoom position stored by the zoom position storage portion 46 that is, in a photographing field determined by the photographer, in the same manner as the first search space SP1 of the above example. Accordingly, when the wide-angle-side end of the zoom lens of the taking lens 21A1 is moved in step S9, the first search space SP1' in the image data A and B by the first and second image taking portions 20A and 20B at the wide-angle-side end is set inward smaller than the photographing field at the wide-angle-side end according to the moved zoom position that is, the photographing magnification, for instance, when the photographing magnification is ×2 or ×3, the first search space SP1' is set inward smaller than the photographing field at the wide-angle-side end by ½ or ⅓ as shown in FIGS. 7, 8A and 8B.

Then the stereomatching processing is carried out on the first search space SP1' (FIG. 7) set as described above in the image data A and B which have been taken at the wide-angle-side end and are stored in the memory portion 31 (step S10), whereby one or more corresponding points which correspond to each other in each image data A and B are detected. Then the frontmost point P nearest to the image taking portions 20A and 20B is detected in the detected corresponding points (step S11).

Detection of the frontmost point P is executed by calculating the three-dimensional coordinates of the detected corresponding points, and detecting the corresponding points that is the smallest in the value of Z-axis coordinate by the position calculating portion 44. Though may be displayed on the monitor 18, for instance, when the alert display processing to be described later, the values of coordinates of the frontmost point P may be recorded as tag information.

Then the space setting portion 42 sets the second search space SP2' corresponding to the zoom position stored in the zoom position storage portion 46 (step S12). The second search space SP2' is set inward smaller than the photographing field at the wide-angle-side end according to the photographing magnification as the first search space SP1' as shown in FIGS. 7, 8A and 8B and the value of the thickness t is set to be 5% of the image area taken at the zoom position which have been stored in the zoom position storage portion 46. Accordingly, when the photographing magnification is ×2 or ×3, the second search space SP2' is set smaller by ½ or ⅓. In the direction of Z-axis, when the frontmost point P(Px, Py, Pz) is included before and after, the predetermined values a and b are also set smaller by ½ or ⅓.

Then the stereomatching processing is carried out on the second search space SP2' set as described above, that is, a left-end face SP2-L', a right-end face SP2-R' and an upper-end face SP2-U' (FIG. 7) in the image data A and B which have been taken at the wide-angle-side end and are stored in the memory portion 31 (step S13), whereby one or more corresponding points which correspond to each other in each image data A and B are detected as shown in FIG. 4B (step S14). The CPU 32 determines whether a corresponding point is detected by the stereomatching processing portion 43 (step S15). When it is determined that a corresponding point is not detected (step S15:NO), the CPU 32 determines that the main object to be photographed is positioned inward of the second search space SP2' or in the photographing field stored in the zoom position storage portion 46 and determines whether the timer system of the self-timer image-taking portion 38 counts 0 in order to take a running image (step S18).

When the CPU 32 determines that the timer system of the self-timer image-taking portion 38 counts 0 (step S18:YES), after the zoom lens of the image taking portion 20A is shifted to the position stored in the zoom position storage portion 46 (step S19), the first image taking portion 20A takes a running image (step S20) and the image processing portion 4A carries out the image processing on the image obtained by taking the running image (step S21). At this time, the image-processed image data may be compressed by the compression/expansion processing portion 40 to form an image file. Then the CPU 32 displays the image-processed image on the monitor 18 and records the same on the external recording medium 36 (step S22). And, the CPU 32 determines whether the power switch turning-OFF action is taken by the power switch 22 (step S23). When the power switch turning-OFF action has been taken (step S23:YES), the CPU 32 turns OFF the power and ends the processing. When the power switch turning-OFF action has not been taken (step S23:NO), the CPU 32 shifts the processing to step S2 and repeats the processing of steps S2 and the following as shown in FIG. 4A. On the other hand, when the CPU 32 does not determine in step S18 that the timer system of the self-timer image-taking portion 38 counts 0 (step S18:NO), the CPU 32 shifts the processing to step S10 and repeats the processing of steps S10 and the following as shown in FIG. 4A.

On the other hand, when it is determined in step S15 that a corresponding point is detected (step S15:YES), whether the corresponding point is inward of the second search space SP2' is determined by calculating the three-dimensional coordinates of the obtained corresponding point and from the obtained value of the Z-axis coordinate (step S17). When it is determined that the corresponding point is not inward of the second search space SP2' (step S17:NO), the CPU 32 determines that the corresponding point represents, for instance as shown in FIG. 7, a part G1 of a building (apart rearward from the image taking portions 20A and 20B) and shifts the processing to step S18 in order to take a running image.

When it is determined that the corresponding point is inward of the second search space SP2' (step S17:YES), the CPU 32 determines that the corresponding point represents, as shown in FIG. 7, for instance, a part G2 of the main object such as the photographer, and determines that the main object is positioned outward the second search space SP2' or the probability that the main object is at least partly positioned outward the second search space SP2' is strong, that is, determines that the main object is at least partly positioned outward the photographing field or the probability that the main object is at least partly positioned outward the photographing field is strong, and the CPU 32 determines whether the zoom position stored in the zoom position storage portion 46 is the wide-angle-side end (step S24). When the CPU 32 determines that the zoom position stored in the zoom position storage portion 46 is not the wide-angle-side end (step S24: NO), the zoom lens control portion 47 shifts the zoom position stored in the zoom position storage portion 46 toward the wide-angle-side end by a predetermined amount and stores it in the zoom position storage portion 46. Thereafter, the timer count system is reset (step S26) to re-start the count down (step S27) and the CPU 32 shifts the processing to step S10 and repeats the processing of steps S10 and the following.

That is, when it is determined in step S17 that the corresponding point is inward of the second search space SP2' (step S17:YES), since the main object is at least partly positioned outward the photographing field or the probability that the main object is at least partly positioned outward the photographing field is strong, in the zoom position stored in the zoom position storage portion 46, a zoom position in which the main object can be surely taken in the photographing field is determined by shifting, toward the wide-angle-side end, the zoom position stored in the zoom position storage portion 46 by the predetermined amount so that no corresponding point is detected or the main object can be surely taken in the photographing field and updating it, and by carrying out the stereomatching processing on the basis of the first and second search spaces SP1' and SP2' in the updated zoom position. Though in this embodiment, the zoom position is detected and stored without actually driving the zoom lens of the image taking portion 20A, the zoom lens of the image taking portion 20A may be actually driven and the zoom position after driven may be stored in the zoom position storage portion 46.

Since it is impossible to widen the photographing field any more when the CPU 32 determines that the zoom position stored in the zoom position storage portion 46 is the wide-angle-side end, that is, it is impossible to take the main object in the photographing field, an alert display portion 45 makes an alert display (step S28).

Figure 9:
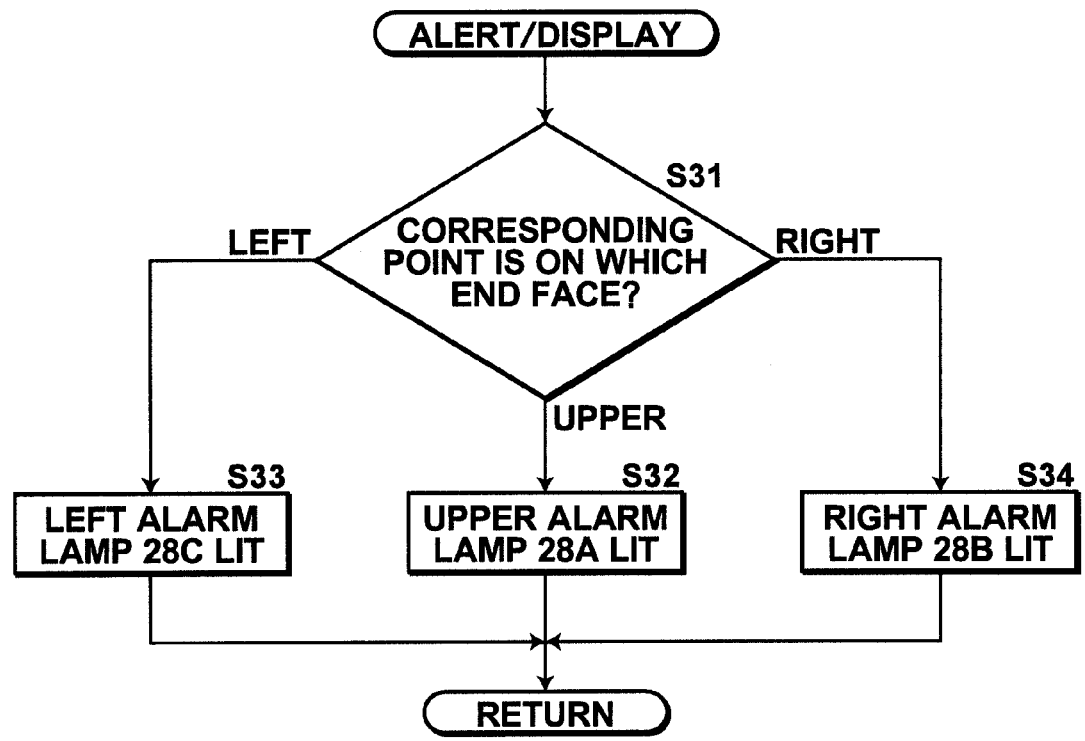
FIG. 9 is a view showing a flowchart for illustrating the alert display processing.

FIG. 9 shows a flowchart for the alert display processing.

The determination portion (the CPU 32) first determines on which end face the left end face SP2-L', the right end face SP2-R', or the upper end face SP2-U', the corresponding point is (step S31) from information on the corresponding point calculated in step S16 (FIG. 4). When it is determined that the corresponding point is on the upper end face SP2-U', the alert display portion 45 lights the alarm lamp 28a (step S32), when it is determined that the corresponding point is on the left end face SP2-L', the alert display portion 45 lights the alarm lamp 28c (step S33), and when it is determined that the corresponding point is on the right end face SP2-R', the alert display portion 45 lights the alarm lamp 28b (step S34). The alarm lamp 28a, 28b or 28c may be caused to blink.

With this arrangement, in the case where the photographer himself or herself moves to the front of the digital camera 1 immediately after the self-timer lamp starts blinking to go in the photographing field and goes in the right of the photographing field so that the photographer's left arm G2 is detected on the right of the photographing field as shown in FIG. 5, for instance when the photographer himself or herself is object person such as when the photographer himself or herself is to be taken together with a building or is to be in a gathering picture, the right alarm lamp 28b is lit as shown in FIG. 1. Accordingly, the photographer himself or herself can easily know that his or her own left arm that is, the left side, is not in the photographing field or that the probability is strong. Accordingly, by moving toward the right as seen from the photographer himself or herself, the photographer himself or herself can be surely in the photographing field. Further, since the apex of the triangle formed by the right alarm lamp 28b directs the orientation in which the photographer himself or herself is to move at this time, he or she can easily know the orientation in which the photographer himself or herself is to move.

When the alert display is thus carried out (step S28), the CPU 32 shifts the processing to step S26 as shown in FIG. 4B, and then repeats the steps S26 and the following until the main object is in the photographing field and a running image is taken. Thus an image is taken by the digital camera 1.

In accordance with the method of taking an image described above, even if the photographer depresses the shutter release button 19 without his or her sufficient confirmation of the photographing field through the monitor 18 or the finder 17, the main object can be automatically in the photographing field.

Though using a self-timer image taking by the self-timer image taking portion 38 in the embodiments described above, the methods of taking an image of the present invention need not be limited to this but may be applied to a remote control image taking where the instruction of taking an image is transmitted to the digital camera 1 by the remote control of a remote control unit. In this case, the timer system may start the count down after the remote control unit instructs the image taking and the light receiving portion of the digital camera 1 receives the control signal. At this time, for instance, when the photographer himself or herself makes the object, since remote control unit can be controlled after the photographer himself or herself moves to the front of the image taking system (the side of the taking lens), the value of the timer may be shorter than in the normal self-timer image taking.

Further, though having the alarm lamps 28 described above in this embodiment, the present invention need not be limited to this but, for instance, the alarm lamps 28 may be used in common to the self-timer lamp 25. In this case, the right alarm, the left alarm and the upper alarm may be distinguished from each other by the difference of frequency of blinking. Further, the alarm may be made by the sound and the like by a speaker (not shown).

Figure 10:
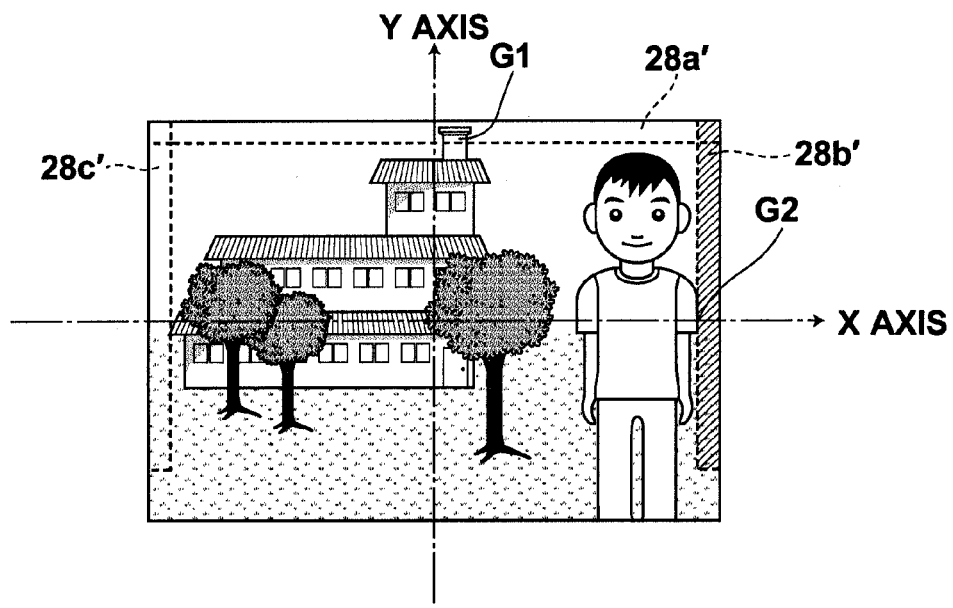
FIG. 10 is a diagram that illustrates an example of display on a monitor.

Further, though the alarm lamps 28 described above are provided on the front of the camera body 10 of the digital camera 1, the present invention need not be limited to this but, for instance, the alarm lamps 28 may be provided on the back of the camera body 10 of the digital camera 1 such as the display in the monitor 18 or a lamp in the finder 17. FIG. 10 shows an example of such a display in the monitor 18. As shown in FIG. 10, an upper alarm area 28*a*', a right alarm area 28*b*' and a left alarm area 28*c*' may be provided in the screen of the monitor 18 at the upper, right and left corners to alarm of the photographer when the photographer is outside the photographing field as described above by, for instance, causing to blink or coloring the alarm areas.

With this arrangement, even if the photographer does not sufficiently confirm the photographing field, when a normal image taking where a self-timer photographing nor a remote control photographing used when the photographer himself or herself is photographed is not used, is to be carried out, since when the photographer himself or herself is not in the photographing field or when the probability is strong, an alarm representing which ends will be outside the photographing field is displayed, failure that a part of the photographer is lost in the obtained image can be prevented. Further, the digital camera 1 may be provided both the alarm lamps 28 and the alarm areas 28' so that they are energized in synchronization with each other or only one of the alarm lamps 28 and the alarm areas 28' is energized.

Though in the method of taking an image in accordance with this embodiment, whether the zoom position stored in the zoom position storage portion 46 is at the wide-angle-side end is determined in step S24 and when it is determined that the zoom position stored in the zoom position storage portion 46 is at the wide-angle-side end (step S24:YES), the alert display processing is carried out, the present invention need not be limited to this but, the system of the embodiments described above may be suitably changed, for instance, a sound may be generated by a speaker (not shown) or the self-timer lamp 25 may be lit.

The image taking system of the present invention may be suitably changed in the design thereof in the range not to depart from the spirit of the present invention without being limited to the digital camera described above.

For example, in the system provided with a light projecting portion and one (the image taking portion 20A) of the image taking portions is employed as an image taking portion for detecting a distance, a distance calculating portion which calculates the distance to the object by receiving reflected light of the light projected from the light projecting portion may be provided instead of the stereomatching portion 43. The distance calculating portion may use a method of calculating the distance to the object where a distance to the object is calculated by using modulated light such as pulses or sine waves as the projected light and measuring the reflecting time of the reflected light, or the phase of the sine waves by pixels. At this time, either of visible light and infrared light may be used as the projected light.

Further, a taking lens may be provided to only one of the two image taking portions so that the entering light is split by a prism, a mirror and the like into two light beams to respectively receive them with a pair of image pick-up elements (CCD 29A or 29B).

What is claimed is:

1. An image taking system comprising
   two or more image taking portions each of which takes an image of an object to generate image data on the image, wherein one of the image taking portions is a running image taking portion provided with a zoom lens and a zoom lens drive means which drives the zoom lens, and at least one of the other image taking portions are image taking portions for measuring a distance provided with a fixed focus lens equal to the wide-angle-side end of the zoom lens in the angle of coverage, further comprising:
   a zoom position storage means which detects and stores the zoom position of the zoom lens,
   a space setting means which sets a search space in a photographing field in zoom position stored in the zoom position storage means,
   an objective body detecting means which detects a predetermined objective body in the search space set by the space setting means,
   a position calculating means, which when the predetermined objective body is detected, calculates the position information of the detected objective body,
   a determining means which determines on the basis of the position information of the detected objective body calculated by the position calculating means whether at least a part of the objective body overlaps a left, right, upper or lower end face of the search space set by the space setting means, and
   a zoom lens control means which when the determining means determines that at least a part of the objective body overlaps an end face of the search space, shifts the zoom position stored by the zoom position storage means by a predetermined amount toward the wide-angle-side and stores the same;
   in which the objective body detecting means carries out a stereomatching processing on the pair of pieces of image data generated by the running image taking portion and the image taking portions for measuring a distance and detects one or more corresponding points which correspond to each other in each image data
   further comprising an alert display means which displays when the determining means determines at least a part of the objective body overlaps one of the end faces, the end face on which the objective body overlaps, and in which
   the alert display means carries out the display when the zoom lens control means shifts the zoom position stored by the zoom position storage means to the wide-angle-side end and stores the same,
   wherein the alert display means is provided on the front surface of the system,
   further comprising a self-timer means which has a self-timer lamp in which the alert display means is used in common with the self-timer lamp,
   wherein, after a shutter release button is ON or the self-timer lamp starts blinking, the zoom position storage means detects and stores current zoom position of the zoom lens,
   wherein the self-timer means resets timer count and restarts to count down after the determining means determines whether the stored zoom position is wide-angle-side end or not, and
   wherein the objective body detecting means repeatedly carries out the stereo matching processing until the self-timer means counts 0.

2. An image-taking system as defined in claim 1 in which the image taking portions but at least the running image taking portion is provided with an image pick-up element less than the running image taking portion in number of pixels and/or having a sensitivity only to the brightness or a monochromatic light.

3. An image-taking system as defined in claim 1 in which the alert display means is provided on the back surface of the system.

4. An image-taking system as defined in claim 2 in which the alert display means is provided on the back surface of the system.

5. An image-taking system as defined in claim 1 in which the alert display means displays the direction in which the objective body is to be moved in order to be in the search space.

6. An image-taking system as defined in claim 2 in which the alert display means displays the direction in which the objective body is to be moved in order to be in the search space.

7. An image taking method comprising the steps of, in the image taking method where images of an object are taken by a running image taking portion provided with a zoom lens and a zoom lens drive means which drives the zoom lens, and at least one image taking portion for measuring a distance provided with a fixed focus lens equal to the wide-angle-side end of the zoom lens to generate image data, detecting and storing a zoom position at an arbitrary angle of view of the zoom lens,
    setting a search space in a photographing field in the stored zoom position,
    taking the images by the running image taking portion and said at least one image taking portion for measuring a distance after moving the zoom lens to the wide-angle-side end of the zoom lens,
    detecting a predetermined objective body in the search space in the image data obtained by the image taking,
    calculating, when the predetermined objective body is detected, the position information of the detected objective body,
    determining on the basis of the position information of the detected objective body whether at least a part of the objective body overlaps a left, right, upper or lower end face of the search space set by the space setting means,
    shifting, when it is determined that at least a part of the objective body overlaps one of the end faces of the search space, the zoom position stored by the zoom position storage means by a predetermined amount toward the wide-angle-side and
    storing the same; further comprising:
    carrying out a stereo-matching processing on a pair of pieces of image data generated by the running image taking portion and the image taking portion for measuring a distance and detecting one or more corresponding points which correspond to each other in each image data,
    wherein when the determining step determines at least a part of the objective body overlaps one of the end faces, displaying the end face on which the objective body overlaps, and display is carried out the display when the zoom position stored in the storing step is shifted,
    wherein the display is provided on a front surface of a system, including the zoom lens, the zoom lens drive means and the running image taking portion and the image taking portion, and
    display is provided in common with a self-timer lamp of a self-timer device,
    wherein, after a shutter release button is ON or the self-timer lamp starts blinking, detecting the zoom position and storing a current zoom position of the zoom lens,
    wherein the self-timer device resets timer count and restarts to count down after determining whether the stored zoom position is wide-angle-side end or not, and
    repeatedly carrying out the stereo matching processing until the self-timer device counts 0.

8. An image-taking system as defined in claim 1 in which the search space set by the space setting means comprises a first search space and a second search space, wherein the first search space is set without being set in the direction of Z-axis of the photographing field; and second search space is set in the direction of Z-axis of the photographing field.

9. The image taking system according to claim 1, further comprising:
    a light receiving portion for receiving a control signal of instruction of taking an image, said control signal is transmitted from a remote control unit.

* * * * *